United States Patent Office 2,829,709
Patented Apr. 8, 1958

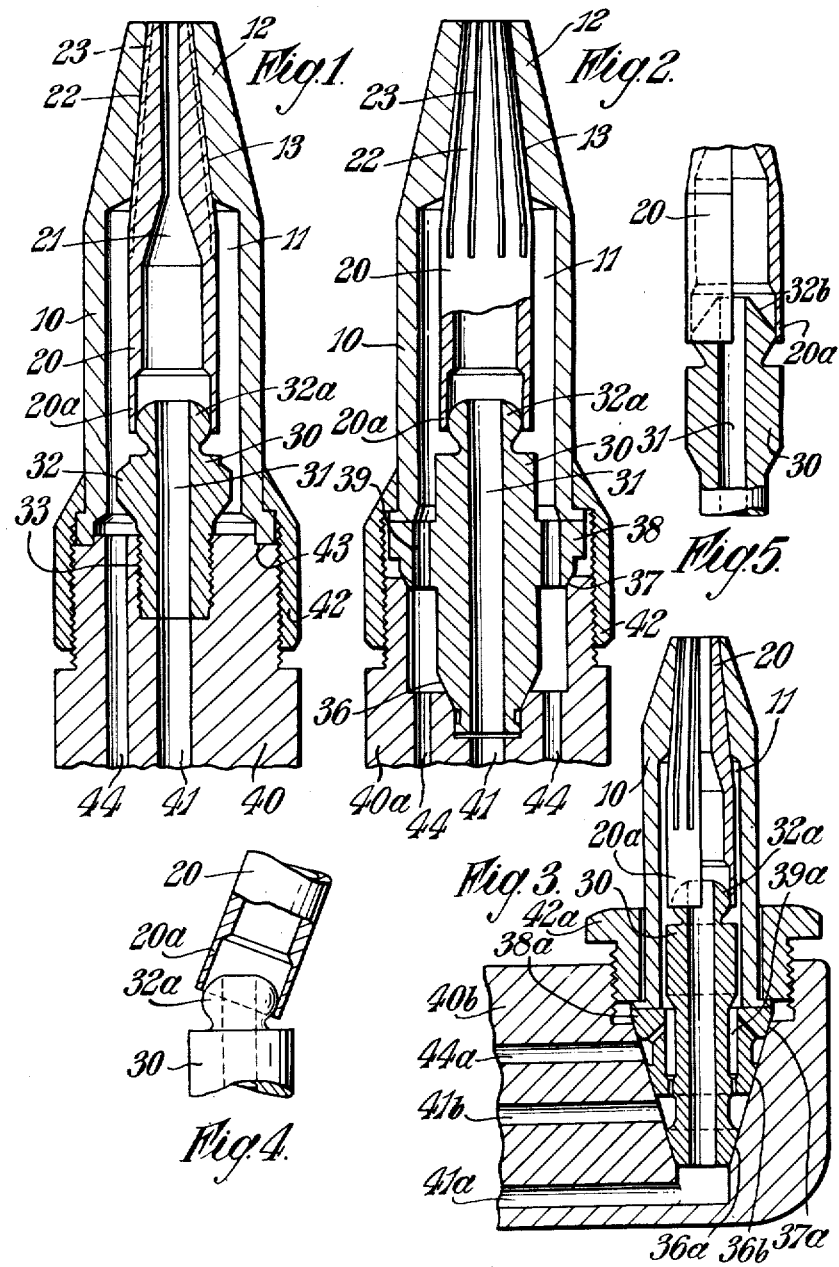

2,829,709

OXYGEN CUTTING NOZZLES

Alfred J. Mathews, York, England, assignor of one-half to Robert Boocock, York, England Application January 11, 1956, Serial No. 558,490

Claims priority, application Great Britain January 12, 1955

5 Claims. (Cl. 158—27.4)

This invention relates to oxygen cutting nozzles such as are used with cutting torches using oxy-acetylene, oxy-propane, oxy-coal gas or like fuel gases. With nozzles as at present generally constructed, their useful life is comparatively short and they have to be completely discarded even though parts may appear serviceable. This is due to burning of the nozzle or more particularly to burning or distortion of the brass or other inner member which upsets the accurate setting of the adjoining parts and prevents the nozzle from producing a flame of the proper form and efficiency.

The chief object of the present invention is to provide an improved construction of oxygen cutting nozzle which will enable a portion thereof to be removed when rendered desirable and replaced by another portion in a simple fashion which will ensure that the portions of the nozzle will fit together and to the torch head in a proper gas-tight manner so as to ensure the production of a flame of the proper form and efficiency.

A further object of the present invention is to ensure that the replaced portions will make a proper fit even if not perfect replicas of the portions they replace, and a still further object is to enable the proper fit to be maintained in spite of a certain amount of wear in the torch head to which the nozzle is secured.

With these objects in view an oxygen cutting nozzle according to this invention comprises a detachable external member, a detachable insert member, and a central stud member which may or may not be detachable from the torch head, the external member being arranged to fit on the insert member near their outer ends through co-acting frusto-conical surfaces one of which bears gas ducts, whilst of the insert member and the stud member one has a spigot end with an outer surface which is partly spherical, curved or otherwise formed to provide an annular line contact surface over which a bored inner end of the other member can fit in gas-tight fashion, the construction being such as to allow relative axial movement between the stud member and insert member when assembled without breaking the gas-tight fit and to allow them to be moved out of axial alignment to separate them when the external member is removed from the torch head.

By such a construction, expansion of the external member and consequent axial movement of the insert member relative to the stud member away from the torch head can take place without interfering with the proper gas-tight fit between the three members. Also this capacity for relative axial movement compensates for slight variations in replacement parts when fitted. Moreover, separation of the insert member from the stud member (as for replacement of the former) can be done by a simple "breaking" action, that is by forcing them out of axial alignment with one another until the insert member "breaks" away from the stud member by the bored end slipping off the spigot end.

Preferably the spigot end is formed on the stud member and the bored end on the insert member, although the reverse arrangement may be used.

The spigot end may be of various forms and the stud member may be constructed for securing to the torch head in various ways to suit different constructions of torch heads, and if desired the stud member may be made in one with the torch head since the head will have a longer life due to the insert member and/or the external member being replaceable when burnt or distorted by use.

In order that the invention may be more clearly understood and readily carried into effect the same will now be more fully described with reference to and by the aid of the accompanying drawings, wherein:

Figure 1 is a longitudinal section through one construction of nozzle according to the invention showing a portion of the torch head to which it is secured;

Figure 2 is a similar view to Figure 1 but showing another construction of nozzle to suit a different form of torch head;

Figure 3 is a further similar view but showing a further alternative construction of nozzle;

Figure 4 is a broken detail view partly in section showing how the insert and stud members can be "broken" apart.

Figure 5 is a broken detail sectional view showing an alternative form of spigot end on the stud member.

In the construction of Figure 1 the cutting nozzle comprises three detachable components, an external member 10, an insert member 20 and a central stud member 30. The central stud member 30 has a central duct 31 and a hexagon portion 32 and is externally screw threaded at 33 to screw into the torch head 40 so as to connect the duct 31 with the oxygen supply duct 41. The stud member has its outer end formed as a spigot 32a in the shape of about three-quarters of a sphere which is slightly flattened giving an outer curved surface which is elliptical and which has a neck below it, such surface having a smooth accurate finish and providing an annular line contact with the inner end 20a of the insert 20. This inner end has a cylindrical bore parallel to its axis and of sufficient length to receive the maximum diameter of the spigot to such a depth as will compensate axially for the fitting together of nozzle members of the slightly varying dimensions found in practice. For example, the maximum spigot diameter at right angles to its axis may be two thousandths of an inch greater than the bore in the insert to give a force fit, and the wall thickness of the insert member around the bore would be sufficiently small to allow of the necessary expansion taking place when forced over the spigot.

The insert 20 has a central axial duct 21 of upwardly diminishing diameter and its outer end 22 is of frusto-conical external form having spline ducts 23 formed on its outer surface, which ducts connect with a chamber 11 surounding said insert and afforded by the interior of the external member 10 which encases the insert and the central stud member. The axial duct 31 of the stud member conveys oxygen from the supply duct 41 to the central duct 21 in the insert. The outer end 12 of the external member 10 is also of frusto-conical form and has a similarly formed internal duct 13 so that it fits closely over the conical end of the insert, the extremities of both the external member 10 and the insert 20 being either flush as illustrated or otherwise relatively positioned according to the fuel to be used, as is understood by those skilled in the art.

The external member 10 serves to hold the insert 20 in position relative to the central stud member 30 and is capable of being secured by a nut 42 to the torch head 40 with its lower end bedding on a shoulder 43 on the head. The head has the usual gas ducts such as 44 communicating with the chamber 11.

The correct relative positions of the seating of the three members 10, 20 and 30 to the torch head 40 is ensured by the capacity for relative axial movement between the stud member 30 and the insert member 20 whilst maintaining gas-tightness, whereby complete interchangeability of all parts by other corresponding parts can be effected with certainty of proper fit.

It will be seen that the parts of the nozzle are readily detachable and any single part can be renewed (particularly the insert 20), thus lengthening the life of the nozzle.

Separation of the insert 20 from the stud member 30 can be done quickly and easily by forcing them out of alignment either before or after removal of the external member 10. This is illustrated in an exaggerated degree by Figure 4 which shows how the inner end 20a of the insert ceases to make line contact with the spigot 32a when removed far enough out of alignment, thus "breaking" the joint easily.

In the construction of Figure 2 the same or similar parts as those of Figure 1 are indicated by the same reference numbers. In this case the stud 30, which may be regarded as an adaptor, has its inner end formed with a frusto-conical portion 36 to fit in a corresponding surface in the modified torch head 40a whilst a further frusto-conical portion 37 of the stud 30 fits on a corresponding annular seat in the top of the head. The external member 10 is held down on an annular flange 38 of the stud 30 by the nut 42 which is screwed on to the head and bears on an annular shoulder on the external member and so holds the stud on to the torch head. Gas ducts 39 pass through the flange 38.

In the construction of Figure 3 the same or similar parts as those of Figures 1 and 2 are indicated by the same reference numbers. In this case the stud 30 has frusto-conical faces 36a, 36b and 37a by which it seats in gas-tight fashion in the torch head 40b which has ducts 41a, 41b and 44a through which cutting oxygen, pre-heat oxygen and fuel gas respectively are led into the nozzle. The pre-heat oxygen passes through ducts 39a where it is joined by the fuel gas and the mixture passes on into the chamber 11. The external member 12 is pressed against flange 38a on the stud 30 by nut 42a screwed into the torch head and thereby the stud base is held into its seatings in the head.

In the alternative form of spigot end shown in Figure 5 this has a frusto-conical surface 32b which at its greatest diameter forms an annular line contact with the surrounding inner end 20a of the insert 20, but which enables the two members to be "broken" apart as already described above.

It will be clear that the stud 30 can be modified to suit the type of torch head to which it has to be fitted. If desired it could be made integral with the torch head.

The external member 10 may be of copper or other suitable material, and it may have a copper or other nose piece which can be replaced when necessary by a new piece.

The seating surfaces at 22, 13 and also at 43 in the Figure 1 construction, at 36 and 37 in the Figure 2 construction, and at 36a, 36b and 37a in the Figure 3 construction, are rendered gas-tight due to the capacity for axial movement of the insert member 20 relative to the stud member 30 provided by the spigot and socket connection which itself forms a seal between members 20 and 30. Thus a proper connection is ensured whenever a part is replaced in spite of slight variations in length between the interchanged parts due to inaccurate machining. Moreover, the positive seating ensured of the conical part of the insert 20 in that of the external member 10 confines the fuel gases to passage through the splines 23, producing a symmetrical preheating flame of great velocity and reducing the possibility of flash-back.

Whilst the above description and the drawings refer to the spigot end being formed on the stud member and the insert member fitting over this, it will be clear that an inversion of this arrangement might also be effective in achieving the object of the invention.

What I claim is:

1. In an oxygen cutting nozzle for use with a cutting torch, the combination of a detachable external member, means for securing said member to a torch head, a detachable insert member arranged to fit within said external member near their outer ends through co-acting frusto-conical surfaces and to be held thereby on said torch head leaving an annular chamber between said members, fuel gas-ducts formed between said surfaces and leading convergingly from the chamber between said two members to the outside of the nozzle, a central stud member and means for securing same in said torch head, and an axial oxygen duct passing through said insert member and said stud member, one of said two latter members having a bored inner end and the other such member having a spigot end with an outer surface which is shaped to provide an annular line contact surface over which said bored inner end of the other member is arranged to fit so as to make gas-tight joint between these two members when the three members are assembled on a torch head and so that limited relative axial movement between said insert member and said stud member when assembled can take place without breaking the gas-tight fit and so that they can be moved out of axial alignment to separate them when said external member is removed from the torch.

2. In an oxygen cutting nozzle for use with a cutting torch, the combination as called for in claim 1 and wherein the spigot receiving end of the one member has a cylindrical bore parallel to its axis and of sufficient length to receive the maximum diameter of the spigot to such a depth as will compensate axially for the gas-tight fitting together of most nozzle members of the slightly varying dimensions found in practice, and wherein the maximum spigot diameter at right angles to its axis is slightly greater than said cylindrical bore to give a force fit, the wall thickness of said bored inner end being sufficiently small to allow of the necessary expansion taking place when forced over the spigot.

3. In an oxygen cutting nozzle for use with a cutting torch, the combination as called for in claim 2 and wherein said spigot is formed as a partial sphere but slightly flattened to give an outer curved surface which is elliptical, the spigot having a neck below it and the said curved surface having a smooth and accurate finish and providing an annular line contact with the bored inner end of the opposing member when the latter is fitted over the spigot.

4. In an oxygen cutting nozzle for use with a cutting torch, the combination as called for in claim 2 and wherein the spigot is formed on the said stud member and the co-acting bored inner end is on the said insert member.

5. In an oxygen cutting nozzle for use with a cutting torch, the combination of an external member having an external annular flange at its base against which bears a coupling nut which secures said member on a torch head, a detachable insert member arranged to fit within said external member near their outer ends through co-acting frusto-conical surfaces and to be held thereby on said torch head leaving an annular chamber between said members, fuel gas-ducts formed between said surfaces and leading convergingly from said chamber to the outside of the nozzle, a central stud member and means for securing same in said torch head, and an axial oxygen duct passing through said insert member and said stud member, the inner end of said insert member having a cylindrical bore parallel to its axis and said stud member having on its inner end a spigot formed as a partial sphere but slightly flattened to give an outer curved surface which is elliptical, said spigot having a neck below it and the said curved surface having a smooth and accurate finish and providing an annular line contact with said bored inner end of the insert member which is arranged to fit over said curved surface of the spigot with a force fit so as to make a gas-tight joint between said insert member and said spigot when the three members are assembled on a torch head and so that limited relative axial movement between said insert member and said spigot when assembled can take place without breaking the gas-tight fit and so that they can be moved out of axial alignment to separate them when said external member is removed from the torch.

References Cited in the file of this patent

UNITED STATES PATENTS

| | | |
|---|---|---|
| 1,597,554 | Thorpe et al. | Aug. 24, 1926 |
| 1,987,002 | Dodge | Jan. 8, 1935 |
| 2,126,423 | Tear | Aug. 9, 1938 |
| 2,136,492 | Creneling | Nov. 15, 1938 |
| 2,378,346 | Wigton | June 12, 1945 |
| 2,380,570 | Babcock | July 31, 1945 |
| 2,392,593 | Jenkins | Jan. 8, 1946 |
| 2,468,824 | Hughey | May 3, 1949 |
| 2,622,668 | Buckle | Dec. 23, 1952 |

FOREIGN PATENTS

| | | |
|---|---|---|
| 569,480 | France | Apr. 12, 1924 |
| 676,978 | Germany | May 25, 1939 |